(12) United States Patent
Bell (10) Patent No.: US 7,742,124 B2
(45) Date of Patent: Jun. 22, 2010

(54) OPTICAL RETARDER

(75) Inventor: Gareth Paul Bell, Huntington (NZ)

(73) Assignee: PureDepth Limited, Auckland (NZ)

( * ) Notice: Subject to any disclaimer, the term of this patent is extended or adjusted under 35 U.S.C. 154(b) by 0 days.

(21) Appl. No.: 10/475,432

(22) PCT Filed: Apr. 22, 2002

(86) PCT No.: PCT/NZ02/00073

§ 371 (c)(1), (2), (4) Date: May 13, 2004

(87) PCT Pub. No.: WO02/086610

PCT Pub. Date: Oct. 31, 2002

(65) Prior Publication Data

US 2004/0183972 A1    Sep. 23, 2004

(30) Foreign Application Priority Data

Apr. 20, 2001    (NZ) ..................... 511255

(51) Int. Cl.
G02F 1/1347    (2006.01)
G02F 1/1335    (2006.01)
(52) U.S. Cl. ............... 349/74; 349/112; 349/117
(58) Field of Classification Search ............. 349/74–83, 349/15, 112, 64, 117
See application file for complete search history.

(56) References Cited

U.S. PATENT DOCUMENTS

| | | | |
|---|---|---|---|
| 2,543,793 A | 3/1951 | Marks | |
| 2,961,486 A | 11/1960 | Marks | |
| 3,536,921 A | 10/1970 | Caulfield | |
| 3,605,594 A | 9/1971 | Gerritsen | |
| 3,622,224 A | 11/1971 | Wysocki et al | |
| 3,863,246 A | 1/1975 | Trcka et al. | |
| 3,891,305 A | 6/1975 | Fader | |
| 3,918,796 A | 11/1975 | Fergason | |
| 3,940,788 A | 2/1976 | Abe et al. | |
| 3,955,208 A | 5/1976 | Wick et al. | |
| 3,992,082 A | 11/1976 | Katz | |
| 4,153,654 A | 5/1979 | Maffitt et al. | |
| 4,165,922 A | 8/1979 | Morrissy | |
| 4,190,856 A | 2/1980 | Ricks | |
| 4,239,349 A * | 12/1980 | Scheffer ................. 349/117 |
| 4,281,341 A | 7/1981 | Byatt | |
| 4,294,516 A | 10/1981 | Brooks | |
| 4,333,715 A | 6/1982 | Brooks | |

(Continued)

FOREIGN PATENT DOCUMENTS

AU    24806/00    7/2000

(Continued)

OTHER PUBLICATIONS

"Clearboard 1991-1994," http://web.media.mit.edu/~ishii/CB.html.

(Continued)

*Primary Examiner*—James A Dudek (57) ABSTRACT

The present invention (1) includes a multi-focal plane display with two or more at least partially overlapping screens (2, 3) with a first order optical retarder (5) interposed therebetween. The invention removes the undersirable presence of colored interference fringes while also providing a means of addressing the polarization incompatibility between adjacent LCD display screens (2, 3).

34 Claims, 1 Drawing Sheet

U.S. PATENT DOCUMENTS

| | | | |
|---|---|---|---|
| 4,447,141 A | 5/1984 | Eisenkraft | |
| 4,448,489 A | 5/1984 | Sato et al. | |
| 4,472,737 A | 9/1984 | Iwasaki | |
| 4,523,848 A | 6/1985 | Gorman et al. | |
| 4,541,692 A | 9/1985 | Collins et al. | |
| 4,613,896 A | 9/1986 | Takita et al. | |
| 4,648,691 A * | 3/1987 | Oguchi et al. | 349/162 |
| 4,649,425 A | 3/1987 | Pund | |
| 4,670,744 A | 6/1987 | Buzak | |
| 4,734,295 A | 3/1988 | Liu | |
| 4,736,214 A | 4/1988 | Rogers | |
| 4,768,300 A | 9/1988 | Rutili | |
| 4,792,850 A | 12/1988 | Liptoh et al. | |
| 5,032,007 A | 7/1991 | Silverstein et al. | |
| 5,046,826 A * | 9/1991 | Iwamoto et al. | 349/65 |
| 5,046,827 A | 9/1991 | Frost et al. | |
| 5,086,354 A | 2/1992 | Bass et al. | |
| 5,107,352 A | 4/1992 | Fergason | |
| 5,112,121 A | 5/1992 | Chang et al. | |
| 5,124,803 A | 6/1992 | Troxel | |
| 5,132,839 A | 7/1992 | Travis | |
| 5,132,878 A | 7/1992 | Carey | |
| 5,261,404 A | 11/1993 | Mick et al. | |
| 5,337,181 A | 8/1994 | Kelly | |
| 5,367,801 A | 11/1994 | Ahn | |
| 5,432,626 A | 7/1995 | Sasuga et al. | |
| 5,473,344 A | 12/1995 | Bacon et al. | |
| 5,537,233 A | 7/1996 | Miura et al. | |
| 5,557,684 A | 9/1996 | Wang et al. | |
| 5,583,674 A | 12/1996 | Mosley | |
| 5,585,821 A | 12/1996 | Ishikura et al. | |
| 5,589,980 A | 12/1996 | Bass et al. | |
| 5,600,462 A * | 2/1997 | Suzuki et al. | 349/112 |
| 5,689,316 A | 11/1997 | Hattori et al. | |
| 5,695,346 A | 12/1997 | Sekiguchi et al. | |
| 5,706,139 A | 1/1998 | Kelly | |
| 5,745,197 A | 4/1998 | Leung et al. | |
| 5,751,385 A * | 5/1998 | Heinze | 349/61 |
| 5,764,317 A | 6/1998 | Sadovnik et al. | |
| 5,796,455 A * | 8/1998 | Mizobata et al. | 349/112 |
| 5,796,509 A | 8/1998 | Doany et al. | |
| 5,822,021 A * | 10/1998 | Johnson et al. | 348/742 |
| 5,825,436 A | 10/1998 | Knight | |
| 5,838,308 A | 11/1998 | Knapp et al. | |
| 5,924,870 A | 7/1999 | Brosh et al. | |
| 5,956,180 A | 9/1999 | Bass et al. | |
| 5,976,297 A | 11/1999 | Oka et al. | |
| 5,990,990 A | 11/1999 | Crabtree | |
| 6,005,654 A | 12/1999 | Kipfer et al. | |
| 6,018,379 A * | 1/2000 | Mizobata et al. | 349/112 |
| 6,061,110 A * | 5/2000 | Hisatake et al. | 349/113 |
| 6,067,137 A * | 5/2000 | Ohnishi et al. | 349/112 |
| 6,100,862 A | 8/2000 | Sullivan | |
| 6,114,814 A | 9/2000 | Shannon et al. | |
| 6,122,103 A | 9/2000 | Perkins et al. | |
| 6,141,067 A | 10/2000 | Ikka | |
| 6,147,741 A | 11/2000 | Chen et al. | |
| 6,204,902 B1* | 3/2001 | Kim et al. | 349/112 |
| 6,239,852 B1* | 5/2001 | Oono et al. | 349/112 |
| 6,287,712 B1 | 9/2001 | Bulovic et al. | |
| 6,300,990 B1* | 10/2001 | Yamaguchi et al. | 349/112 |
| 6,326,738 B1 | 12/2001 | McAndrew | |
| 6,341,439 B1 | 1/2002 | Lennerstad | |
| 6,351,298 B1* | 2/2002 | Mitsui et al. | 349/113 |
| 6,377,306 B1 | 4/2002 | Johnson et al. | |
| 6,392,725 B1 | 5/2002 | Harada et al. | |
| 6,412,953 B1 | 7/2002 | Tiao et al. | |
| 6,443,579 B1 | 9/2002 | Myers | |
| 6,489,044 B1 | 12/2002 | Chen et al. | |
| 6,504,587 B1 | 1/2003 | Morishita et al. | |
| 6,512,559 B1* | 1/2003 | Hashimoto et al. | 349/74 |
| 6,515,881 B2 | 2/2003 | Chou et al. | |
| 6,557,999 B1 | 5/2003 | Shimizu | |
| 6,562,440 B1 | 5/2003 | Tsuchiya et al. | |
| 6,573,961 B2 | 6/2003 | Jiang et al. | |
| 6,578,985 B1 | 6/2003 | Seraphim et al. | |
| 6,590,605 B1 | 7/2003 | Eichenlaub | |
| 6,593,904 B1 | 7/2003 | Marz et al. | |
| 6,609,799 B1 | 8/2003 | Myers | |
| 6,639,349 B1 | 10/2003 | Bahadur | |
| 6,679,613 B2 | 1/2004 | Mabuchi | |
| 6,693,692 B1* | 2/2004 | Kaneko et al. | 349/117 |
| 6,771,327 B2* | 8/2004 | Sekiguchi | 349/12 |
| 6,812,649 B2 | 11/2004 | Kim | |
| 6,845,578 B1 | 1/2005 | Lucas | |
| 6,897,855 B1 | 5/2005 | Matthies et al. | |
| 6,906,762 B1 | 6/2005 | Witehira et al. | |
| 6,947,024 B2 | 9/2005 | Lee et al. | |
| 7,072,095 B2 | 7/2006 | Liang et al. | |
| 7,205,355 B2 | 4/2007 | Liang et al. | |
| 7,262,752 B2 | 8/2007 | Weindorf | |
| 7,352,424 B2 | 4/2008 | Searle | |
| 7,372,447 B1 | 5/2008 | Jacobsen et al. | |
| 2001/0040652 A1 | 11/2001 | Hayashi | |
| 2002/0027608 A1 | 3/2002 | Johnson et al. | |
| 2002/0047601 A1 | 4/2002 | Shannon et al. | |
| 2002/0064037 A1 | 5/2002 | Lee | |
| 2002/0075211 A1 | 6/2002 | Nakamura | |
| 2002/0105516 A1 | 8/2002 | Tracy | |
| 2002/0111195 A1 | 8/2002 | Kweon et al. | |
| 2002/0163728 A1 | 11/2002 | Myers | |
| 2002/0163729 A1 | 11/2002 | Myers | |
| 2003/0043106 A1 | 3/2003 | Woo | |
| 2003/0132895 A1 | 7/2003 | Berstis | |
| 2003/0184665 A1 | 10/2003 | Berstis | |
| 2004/0012708 A1 | 1/2004 | Matherson | |
| 2005/0146787 A1 | 7/2005 | Lukyanitsa | |
| 2006/0103951 A1 | 5/2006 | Bell et al. | |

FOREIGN PATENT DOCUMENTS

| | | |
|---|---|---|
| AU | 24538/00 | 8/2000 |
| AU | 68219/01 | 12/2001 |
| CA | 2009960 | 9/1990 |
| CA | 2020372 | 1/1991 |
| CA | 2104294 | 8/1992 |
| CA | 2345128 | 3/2000 |
| CN | 1356584 | 7/2002 |
| CN | 1369997 | 9/2002 |
| DE | 2730785 | 1/1979 |
| DE | 19757378 | 7/1998 |
| DE | 29912074 | 11/1999 |
| DE | 19920789 | 5/2000 |
| DE | 19916747 | 10/2000 |
| EP | 0 195 584 | 9/1986 |
| EP | 409188 | 7/1989 |
| EP | 0 336 351 | 10/1989 |
| EP | 0389123 | 9/1990 |
| EP | 454423 | 10/1991 |
| EP | 0573433 | 12/1993 |
| EP | 595387 | 5/1994 |
| EP | 0802684 | 10/1997 |
| EP | 1116070 | 3/2000 |
| EP | 0999088 | 5/2000 |
| EP | 1151430 | 8/2000 |
| EP | 1155351 | 8/2000 |
| EP | 1046944 | 10/2000 |
| EP | 1081774 | 3/2001 |
| EP | 1093008 | 4/2001 |
| EP | 2000/0733927 | 7/2001 |
| EP | 1231757 | 8/2002 |
| EP | 1271944 | 1/2003 |
| EP | 1287401 | 3/2003 |
| EP | 1923860 | 5/2008 |

| | | |
|---|---|---|
| GB | 1 448 520 | 9/1976 |
| GB | 2312584 | 10/1997 |
| GB | 2314943 | 1/1998 |
| GB | 2347003 | 8/2000 |
| GB | 2372618 | 8/2002 |
| IL | 93472 | 11/1994 |
| JP | 49096628 | 1/1973 |
| JP | 56-007916 | 1/1981 |
| JP | 57-119389 | 7/1982 |
| JP | 60-103895 | 6/1985 |
| JP | 60-122920 | 7/1985 |
| JP | 60211830 | 10/1985 |
| JP | 60-233684 | 11/1985 |
| JP | 60-244924 | 12/1985 |
| JP | 61-166524 | 7/1986 |
| JP | 61-200783 | 9/1986 |
| JP | 62-067094 | 3/1987 |
| JP | 62-122494 | 6/1987 |
| JP | 62-161294 | 7/1987 |
| JP | 62-191819 | 8/1987 |
| JP | 62-191820 | 8/1987 |
| JP | 62-235929 | 10/1987 |
| JP | 63-100898 | 5/1988 |
| JP | 63-203088 | 8/1988 |
| JP | 63-274918 | 8/1988 |
| JP | 63-318856 | 12/1988 |
| JP | 2-262119 | 10/1990 |
| JP | 03-002835 | 1/1991 |
| JP | 3021902 | 1/1991 |
| JP | 3-101581 | 4/1991 |
| JP | 3148622 | 6/1991 |
| JP | 3174580 | 7/1991 |
| JP | 3-233548 | 10/1991 |
| JP | 3226095 | 10/1991 |
| JP | 4-034521 | 2/1992 |
| JP | 4-034595 | 2/1992 |
| JP | 04107540 | 4/1992 |
| JP | 4191755 | 7/1992 |
| JP | 5-007373 | 1/1993 |
| JP | 5-091545 | 4/1993 |
| JP | 5-142515 | 6/1993 |
| JP | 6-233328 | 8/1994 |
| JP | 63-039299 | 11/1994 |
| JP | 8-076139 | 3/1995 |
| JP | 7146473 | 6/1995 |
| JP | 07-198942 | 8/1995 |
| JP | 7-209573 | 8/1995 |
| JP | 7-222202 | 8/1995 |
| JP | 8-036375 | 2/1996 |
| JP | 08335043 | 12/1996 |
| JP | 09-033858 | 2/1997 |
| JP | 9-043540 | 2/1997 |
| JP | 9-096789 | 4/1997 |
| JP | 9-102969 | 4/1997 |
| JP | 9-133893 | 5/1997 |
| JP | 9-282357 | 10/1997 |
| JP | 9-308769 | 12/1997 |
| JP | 10-003355 | 1/1998 |
| JP | 10039821 | 2/1998 |
| JP | 10-105829 | 4/1998 |
| JP | 10-228347 | 8/1998 |
| JP | 10232304 | 9/1998 |
| JP | 10-312033 | 11/1998 |
| JP | 11-066306 | 3/1999 |
| JP | 11-205822 | 7/1999 |
| JP | 2000-075135 | 3/2000 |
| JP | 2000-111940 | 4/2000 |
| JP | 2000-113988 | 4/2000 |
| JP | 2000-142173 | 5/2000 |
| JP | 2001-56410 | 2/2001 |
| JP | 2001-215332 | 4/2002 |
| JP | 2002-258284 | 9/2002 |
| JP | 2002-287144 | 10/2002 |
| JP | 2002-350772 | 12/2002 |
| JP | 2003-015555 | 1/2003 |
| JP | 2002-099223 | 10/2003 |
| JP | 2002-156608 | 12/2003 |
| NO | 20005178 | 4/2001 |
| PL | 343229 | 4/2001 |
| WO | 91/12554 | 8/1991 |
| WO | 91/15930 | 10/1991 |
| WO | 92/09003 | 5/1992 |
| WO | 92/15170 | 9/1992 |
| WO | 97/14987 | 4/1997 |
| WO | 98/04087 | 1/1998 |
| WO | 98/16869 | 4/1998 |
| WO | 98/47106 | 10/1998 |
| WO | 99/42889 | 8/1999 |
| WO | 9944095 | 9/1999 |
| WO | 00/17708 | 3/2000 |
| WO | 00/36578 | 6/2000 |
| WO | 00/48167 | 8/2000 |
| WO | 00/49453 | 8/2000 |
| WO | 01/15128 | 3/2001 |
| WO | 01/95019 | 12/2001 |
| WO | 0235277 | 5/2002 |
| WO | 02/091033 | 11/2002 |
| WO | 03/003109 | 1/2003 |
| ZA | 9703025 | 11/1997 |

OTHER PUBLICATIONS

"Teamworkstation 1989-1994," http://web.media.mit.edu/~ishii/TWS.html.
"Textarc: An Alternate Way to View a Text," http://textarc.org.
"Textarc: NYSCA Grant and Public Installation," http//textarc.org.
"Textarc: The Print and the Artist," http://textarc.org.
Courter et al., Microsoft Office 2000 Professional Edition, 1999, Sybex Inc., pp. xxxi, 543, 685.
Harrison et al., "Transparent Layered User Interfaces: An Evaluation of a Display Design to Enhance Focused and Divided Attention" ACM, 13 pages, 1995.
Ishii et al., "Iterative Design of Seamless Collaboration Media", Communications of the ACM, Aug. 1994, vol. 37, pp. 83-97.
Office Action U.S. Appl. No. 10/416,885 Jun. 15, 2006.
Office Action U.S. Appl. No. 10/416,885 Nov. 2, 2005.
Office Action U.S. Appl. No. 10/492,624 Aug. 1, 2007.
Office Action U.S. Appl. No. 10/508,726 Jun. 1, 2007.
Office Action U.S. Appl. No. 10/508,726 Sep. 21, 2007.
Office Action U.S. Appl. No. 10/508,726 Dec. 11, 2006.
Office Action U.S. Appl. No. 11/402,847 Jan. 14, 2008.
Office Action U.S. Appl. No. 11/402,847 Jun. 4, 2007.
Office Action U.S. Appl. No. 11/402,847 Sep. 12, 2007.
Office Action U.S. Appl. No. 11/402,847 Nov. 16, 2006.
Office Action U.S. Appl. No. 10/492,624 Mail Date Jan. 5, 2009.
Office Action U.S. Appl. No. 10/492,624 Mail Date Aug. 1, 2007.
Office Action U.S. Appl. No. 10/508,726 Mail Date May 1, 2008.
Office Action U.S. Appl. No. 10/528,334 Mail Date Aug. 5, 2008.
Office Action U.S. Appl. No. 10/528,334 Mail Date Feb. 24, 2009.
"Kodak Datashow HR/M Projection Pad", Motion Picture & Audiovisual Products, Eastman Kodak Co., 1988.
Alampiev et al., "Technology of the Three Dimensional Electronic Matrix for Liquid Crystal Display" Jan. 1, 1976.
Blundell et al., "Volumetric Three-Dimensional Display Systems", pp. 1-7.
Buzak, "CRT Displays Full-color 3-D Images".
Cole, et al.; "A Three-Dimensional Display for Radar Returns", pp. 52-53.
General Electric, "3-D Liquid Crystal Display for Mine Detecting Radar" Apr. 1, 1974.
Hattori, T. et al,; "Spatial Modulation Display Using Spatial Light Modulators", Optical Engineering, vol. 31, No. 2, pp. 350-352, (Feb. 1992).
Kozo, T. "Three-Dimentional Display System by Laminated Liquid Crystal Display Device", Patent Abstracts of Japan 02-262119 A, vol. 15, No. 19, pp. 1153, (Jan. 16, 1998).

L.F. Hodges et al., "True Three-Dimensional CRT-Based Displays," Infor. Display, pp. 18-22 (May 1987).

Minoru, T. "Displaying Method for Stereoscopic Image Using Liquid Crystal Display Element", Patent Abstracts of Japan 62-235929 A, vol. 12, No. 102, pp. 684, (Apr. 5, 1998).

Tamura et al., "Multilayer 3-D Display Adapter", Applied Optics, vol. 17, No. 23, pp. 3695-3696 (Dec. 1, 1978).

Technical Report of the Institute of Television Engineers of Japan, vol. 20, No. 5, Feb. 1996.

Tomohiko Hattori et al: "Spatial Light Modulators" Optical Engineering, vol. 31, No. 2, Feb. 1, 1992, pp. 350-352.

Non Final OA Dated Jan. 5, 2009; U.S. Appl. No. 10/492,624.

Final OA Dated Feb. 24, 2009; U.S. Appl. No. 10/528,334.

Non Final OA Dated Apr. 29, 2009; U.S. Appl. No. 10/521,413.

Non-Final Office Action Dated Jun. 22, 2009; U.S. Appl. No. 10/492,624.

Non-Final Office Action Dated Sep. 1, 2009; U.S. Appl. No. 10/528,334.

Final Office Action Dated Oct. 19, 2009; U.S. Appl. No. 10/521,413.

Non-Final Office Action Dated Dec. 28, 2009; U.S. Appl. No. 12/046,265.

Final Office Action; Mail Date Feb. 5, 2010; U.S. Appl. No. 10/492,624.

* cited by examiner

OPTICAL RETARDER

CLAIM FOR PRIORITY

This application claims priority from International Application Ser. No. PCT/NZ02/00073 having an International Filing Date of 22 Apr., 2002 and a Priority Date of 20 Apr. 2001.

TECHNICAL FIELD

The present invention applies generally to the field of optical retarders and in particular to those suitable for use with multi-layered viewing screens.

BACKGROUND ART

The benefits of multi-layered viewing screens, in particular those utilising the technology described in the co-pending patent application Ser. Nos. NZ314566, NZ328074, NZ329130, PCT/NZ/98/00098 and PCT/NZ/99/00021 are gaining increasingly widespread recognition and acceptance due to their enhanced capabilities compared to conventional single focal plane displays.

The manner in which human beings process visual information has been the subject of extensive and prolonged research in an attempt to understand this complex process. The term preattentive processing has been coined to denote the act of the subconscious mind in analysing and processing visual information which has not become the focus of the viewer's conscious awareness.

When viewing a large number of visual elements, certain variations or properties in the visual characteristics of elements can lead to rapid detection by preattentive processing. This is significantly faster than requiring a user to individually scan each element, scrutinising for the presence of the said properties. Exactly what properties lend themselves to preattentive processing has in itself been the subject of substantial research. Colour, shape, three-dimensional visual clues, orientation, movement and depth have all been investigated to discern the germane visual features that trigger effective preattentive processing. Researchers such as Triesman [1985] conducted experiments using target and boundary detection in an attempt to classify preattentive features. Preattentive target detection was tested by determining whether a target element was present or absent within a field of background distractor elements. Boundary detection involves attempting to detect the boundary formed by a group of target elements with a unique visual feature set within distractors. It maybe readily visualised for example that a red circle would be immediately discernible set amongst a number of blue circles. Equally, a circle would be readily detectable if set amongst a number of square shaped distractors. In order to test for preattentiveness, the number of distractors as seen is varied and if the search time required to identify the targets remains constant, irrespective of the number of distractors, the search is said to be preattentive. Similar search time limitations are used to classify boundary detection searches as preattentive.

A widespread threshold time used to classify preattentiveness is 200-250 msec as this only allows the user opportunity for a single 'look' at a scene. This timeframe is insufficient for a human to consciously decide to look at a different portion of the scene. Search tasks such as those stated above maybe accomplished in less than 200 msec, thus suggesting that the information in the display is being processed in parallel unattendedly or pre-attentively.

However, if the target is composed of a conjunction of unique features, i.e. a conjoin search, then research shows that these may not be detected preattentively. Using the above examples, if a target is comprised for example, of a red circle set within distractors including blue circles and red squares, it is not possible to detect the red circle preattentively as all the distractors include one of the two unique features of the target.

Whilst the above example is based on a relatively simple visual scene, Enns and Rensink [1990] identified that targets given the appearance of being three dimensional objects can also be detected preattentively. Thus, for example a target represented by a perspective view of a cube shaded to indicate illumination from above would be preattentively detectable amongst a plurality of distractor cubes shaded to imply illumination from a different direction. This illustrates an important principle in that the relatively complex, high-level concept of perceived three dimensionality may be processed preattentively by the sub-conscious mind. In comparison, if the constituent elements of the above described cubes are re-orientated to remove the apparent three dimensionality, subjects cannot preattentively detect targets which have been inverted for example. Additional experimentation by Brown et al [1992] confirm that it is the three dimensional orientation characteristic which is preattentively detected. Nakaymyama and Silverman [1986] showed that motion and depth were preattentive characteristics and that furthermore, stereoscopic depth could be used to overcome the effects of conjoin. This reinforced the work done by Enns Rensink in suggesting that high-level information is conceptually being processed by the low-level visual system of the user. To test the effects of depth, subjects were tasked with detecting targets of different binocular disparity relative to the distractors. Results showed a constant response time irrespective of the increase in distractor numbers.

These experiments were followed by conjoin tasks whereby blue distractors were placed on a front plane whilst red distractors were located on a rear plane and the target was either red on the front plane or blue on the rear plane for stereo colour (SC) conjoin tests, whilst stereo and motion (SM) trials utilised distractors on the front plane moving up or on the back plane moving down with a target on either the front plane moving down or on the back plane moving up.

Results showed the response time for SC and SM trials were constant and below the 250 msec threshold regardless of the number of distractors. The trials involved conjoin as the target did not possess a feature unique to all the distractors. However, it appeared the observers were able to search each plane preattentively in turn without interference from distractors in another plane.

This research was further reinforced by Melton and Scharff [1998] in a series of experiments in which a search task consisting of locating an intermediate-sized target amongst large and small distractors tested the serial nature of the search whereby the target was embedded in the same plane as the distractors and the preattentive nature of the search whereby the target was placed in a separate depth plane to the distractors.

The relative influence of the total number of distractors present (regardless of their depth) verses the number of distractors present solely in the depth plane of the target was also investigated. The results showed a number of interesting features including the significant modification of the response time resulting from the target presence or absence. In the target absence trials, the reaction times of all the subjects displayed a direct correspondence to the number of distractors whilst the target present trials did not display any such dependency. Furthermore, it was found that the reaction times in instances where distractors were spread across multiple depths were faster than for distractors located in a single depth plane.

Consequently, the use of a plurality of depth/focal planes as a means of displaying information can enhance preattentive processing with enhanced reaction/assimilation times.

There are two main types of Liquid Crystal Displays used in computer monitors, passive matrix and active matrix. Passive-matrix Liquid Crystal Displays use a simple grid to supply the charge to a particular pixel on the display. Creating the grid starts with two glass layers called substrates. One substrate is given columns and the other is given rows made from a transparent conductive material. This is usually indium tin oxide. The rows or columns are connected to integrated circuits that control when a charge is sent down a particular column or row. The liquid crystal material is sandwiched between the two glass substrates, and a polarizing film is added to the outer side of each substrate.

A pixel is defined as the smallest resolvable area of an image, either on a screen or stored in memory. Each pixel in a monochrome image has its own brightness, from 0 for black to the maximum value (e.g. 255 for an eight-bit pixel) for white. In a colour image, each pixel has its own brightness and colour, usually represented as a triple of red, green and blue intensities. To turn on a pixel, the integrated circuit sends a charge down the correct column of one substrate and a ground activated on the correct row of the other. The row and column intersect at the designated pixel and that delivers the voltage to untwist the liquid crystals at that pixel.

The passive matrix system has significant drawbacks, notably slow response time and imprecise voltage control. Response time refers to the Liquid Crystal Displays ability to refresh the image displayed. Imprecise voltage control hinders the passive matrix's ability to influence only one pixel at a time. When voltage is applied to untwist one pixel, the pixels around it also partially untwist, which makes images appear fuzzy and lacking in contrast.

Active-matrix Liquid Crystal Displays depend on thin film transistors (TFT). Thin film transistors are tiny switching transistors and capacitors. They are arranged in a matrix on a glass substrate. To address a particular pixel, the proper row is switched on, and then a charge is sent down the correct column. Since all of the other rows that the column intersects are turned off, only the capacitor at the designated pixel receives a charge. The capacitor is able to hold the charge until the next refresh cycle. And if the amount of voltage supplied to the crystal is carefully controlled, it can be made to untwist only enough to allow some light through. By doing this in very exact, very small increments, Liquid Crystal Displays can create a grey scale. Most displays today offer 256 levels of brightness per pixel.

A Liquid Crystal Display that can show colours must have three subpixels with red, green and blue colour filters to create each colour pixel. Through the careful control and variation of the voltage applied, the intensity of each subpixel can range over 256 shades. Combining the subpixel produces a possible palette of 16.8 million colours (256 shades of red×256 shades of green×256 shades of blue).

Liquid Crystal Displays employ several variations of liquid crystal technology, including super twisted nematics, dual scan twisted nematics, ferroelectric liquid crystal and surface stabilized ferroelectric liquid crystal. They can be lit using ambient light in which case they are termed as reflective, backlit and termed Tran missive, or a combination of backlit and reflective and called transflective. There are also emissive technologies such as Organic Light Emitting Diodes, and technologies which project an image directly onto the back of the retina which are addressed in the same manner as Liquid Crystal Displays. These devices are described hereafter as LCD panels.

In the case of a display comprising two or more overlapping parallel LCD panels, an inherent characteristic of using conventionally constructed LCD screens is that the polarisation of the light emanating from the front of the rearward screen is mis-aligned with the orientation of rear polariser of the front screen.

Known techniques to overcome this drawback have to date involved the use of retarder films located between the two liquid crystal displays.

Optical retarders, also known as retardation plates, wave plates and phase shifters, may be considered as polarisation form converters with close to a 100% efficiency. A retarder may be simply defined as a transmisive material having two principle axes, slow and fast, which resolves the incident beam into two orthogonally polarised components parallel to the slow and fast axes without appreciable alteration of the of the intensity or degree of polarisation. The component parallel to the slow axis is retarded with respect to the beam component parallel to the fast axis. The two components are then reconstructed to form a single emergent beam with a specific polarisation form. The degree of retardance/retardation denoting the extent to which the slow component is retarded relative to the fast component is generally expressed in terms of a) linear displacement—the difference in the optical path length between the wave fronts of the two components, expressed in nanometers (nm);

b) fractional wavelength—the optical path length difference expressed as a fraction of a given wavelength, obtained by dividing linear displacement values by a particular phase angle value or wavelength by $2\pi$, e.g 280 nm/560 nm=½ wave retarder; and c) phase angle—the phase difference between the wave fronts of the two component beams, expressed in degrees eg 90°, 180° or radians, ½$\pi$, $\pi$.

It can be thus seen that:

$$\delta = \Gamma/\lambda \cdot 2\pi$$

where $\delta$=the phase angle $\Gamma$=the linear displacement $\lambda$=the wavelength $\Gamma/\lambda$=is the fractional wavelength.

If the thickness of the retarder produces a linear displacement less than the wavelength, the retarder produces a phase angle of less than $\pi$ and is said to be of the first order. If the resultant phase angle is between $\pi$ and $2\pi$ then the retarder is said to be of the second order, if between $2\pi$ and $3\pi$ it is a third order retarder and so forth. The mean wavelength of the visible spectrum (560 nm) is used as the reference wavelength for optical retarders.

Correspondingly, a retarder may be employed as a polarisation form converter to rotate the output polarised light from the rear most liquid crystal display of a multi-screened LCD unit through the required angle to align with the polarisation plane of the rear surface of the front liquid crystal display. Polyesters such as polycarbonate are known retarders with a low intrinsic cost, though they are difficult to produce with sufficient chromatic uniformity to avoid the appearance of coloured 'rainbow-like' interference patterns when viewed between crossed polarisers. This is due (at least in part) to the thickness to which such sheets of polycarbonate are available, which result in second or higher order retarders.

In second, third or higher order retarders, the different wavelengths of the spectrum constituents of white light are retarded to by the same linear displacement, but by different phase angles such that pronounced coloured interference fringes result.

There are further complications with the manufacture of such multi-focal plane LCD displays. The fine regular structures formed by the coloured filters and black pixel matrix on the alignment layers of each liquid crystal display produce a specific pattern in the light transmitted which, when combined with the corresponding pattern created by the second liquid crystal display, causes an interference effect—i.e. moiré interference, degrading the resulting image seen by the viewer.

In order to eliminate these interference effects, a diffuser is inserted between the two liquid crystal displays. This may take the form of an individual layer/sheet or alternatively be formed by the application of a particular pattern or structure to the surface of the retarder. Chemical etching is a relatively cheap means of applying the required pattern, though in practice it has been found deficient for producing acceptable results in combination with a polyester or polyester retarder.

Alternatives to chemical etching include embossing, impressing or calendering of the said pattern by a holographically-recorded master onto the surface of the polyester retarder, forming a random, non-periodic surface structure. These randomised structures may be considered as a plurality of micro lenslets diffusing incident light to eliminate moiré interference and colour defraction. This method is however significantly more expensive than conventional methods such as chemical etching. Further alternatives include specifically engineered retarder films with no diffusive capability but these are also costly and have chromatic uniformity problems.

It is also possible to assemble the front liquid crystal display panel with the polarising plane of the rearward surface aligned with that of the front surface of the rear-most liquid crystal display. Unfortunately, this involves a large non-refundable engineering cost as it cannot be accommodated in the manufacture of conventional LCD units and thus requires production as custom units. In practice it is not possible to rotate the polarisers on the forward display panel without changing the rubbing axis on the glass as the contrast ratio of the image would deteriorate. However, there would be no physical indication of the rubbed orientation of an LCD mother glass (as the process literally involves rubbing the polyimide layer on the glass with a rotating velvet cloth) without labelling and this would cause significant disruption to the manufacturing process.

By contrast, use of a retarder enables the requisite polarization orientation change to be discerned by examining the polarization/glass finish to aclimate the retarder adhesive. This is clearly visible by the unaided eye and is one of the last production stages, thus reducing potential risk.

It is also possible to utilise a third party (i.e., not the original manufacturer) to realign the respective polarising screens though this is also expensive and runs the risk of damaging the display panels. Damage can occur during numerous steps in such a third party procedure, including any or all of the following;

1. removing the LCD panel from its surround:—possible damage to TAB drivers or the glass;
2. removing the polariser:—heating of the polariser is required to reduce its adhesion and can damage the glass, damage individual pixels from excessive pressure, and the liquid crystals may be overheated;
3. misalignment of the new polariser;
4. replacing the panel in the original packaging—again causing possible damage to tab boards or the glass; and
5. electrical static damage at any point of the procedure.

Furthermore, some or all of the interstitial optical elements located between the display layers (i.e. the LCD panels) may change the optical path length of light incident on the second (or successive) screen having passed through the first display. This alteration in path length leads to chromatic aberrations that require correction to ensure a clear display image.

Interstitial elements which may introduce such optical path length changes include:
Air;
nitrogen, or any other inert gas;
a selective diffusion layer;
Polymer Dispersed Liquid Crystal;
Ferroelectric Liquid Crystal;
Liquid Crystal between random homogeneous alignment layers;
Acrylic, Polycarbonate, Polyester;
Glass;
Antireflective coating;
Optical cement;
Diffusive film;
Holographic diffusion film; and
any other filter for removing moiré interference Thus, there is the combined need to cost-effectively re-align the polarisation between successive LCD panels, whilst avoid chromatic aberrations such as coloured interference fringes present with the use of existing retarder such as polycarbonate.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a multi-focal plane display including at least two at least partially overlapping display surfaces having a first order optical retarder interposed between at least two said screens.

A first order optical retarder produces a phase angle displacement or retardation of less than or equal to that of the incident wavelength. Furthermore, it has been found that a first order retarder does not produce discernible coloured interference fringes when used in said displays.

Suitable materials for production of first order retarders have hitherto suffered from significant drawbacks such as instability underexposure to bright lights and/or ageing, discoloration over time, manufacturing expense, brittleness and so forth.

Thus, according to a further aspect of the present invention, there is provided a display as hereinbefore described, wherein said first order retarder is a material with the optical properties of a biaxial polypropylene.

Preferably, the said optical properties include those of a diffuser.

The diffuser may be either formed as a separate layer distinct from said retarder or diffusive properties may be applied to the surface of the retarder itself.

According to a further embodiment, said diffusive effects of the diffuser are formed by a means selected from the group comprising chemical etching; embossing; impressing: or calendering a random, non-periodic surface structure onto the diffuser surface.

The ideal separation of the said diffuser from the surface of the display surface is a trade off between image clarity (decrease with separation) and diffusion of the moiré effects. The separation of the diffusive layer from the display surface can be controlled by using adhesive of various thickness, to attach the diffuser to the display surface. This is applicable for both the use of a separate distinct diffuser or one integrally formed with, or attached to the said retarder.

Thus, according to a further aspect of the present invention, the said diffuser is adhered to said display by adhesive of a predetermined thickness.

In a display as described herein, used with visible light with a mean wavelength of 560 nm, said first order retarder has a phase difference of less than or equal to 560 nm.

Thus, according to a further aspect of the present invention, said retarder causes a phase angle retardation of less than or equal to one wavelength of light incident on said display. This is may be alternatively expressed as a linear displacement of less than or equal to 560 nm of said incident light.

The biaxial polypropylene is preferably formed as clear flexible film, though may conceivably be formed as a film, lacquer or coating.

According to another aspect of the present invention there is provided a method of manufacturing a multi-focal plane display including positioning a first order optical retarder between at least two partially overlapping display surfaces.

According to another aspect of the present invention there is provided a biaxial polypropylene layer adapted for use in an optical system.

Said optical system need not be restricted to multi-focal plane displays as described above, but includes any optical system capable of utilising the said optical properties of biaxial polypropylene, and in particular, those of a retarder.

However, to date, biaxial polypropylene has not been employed for its optical properties, and in particular those of retardation. It has been found that replacing known retarders—such as polycarbonate in multi-layer displays by film of biaxial polypropylene that unexpectedly advantageous results are obtained in comparison to the prior art.

The multi focal plane displays are preferably formed from liquid crystal panels, though it will be appreciated that other forms of optically active display elements may be used and are thus incorporated within the scope of the present invention.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
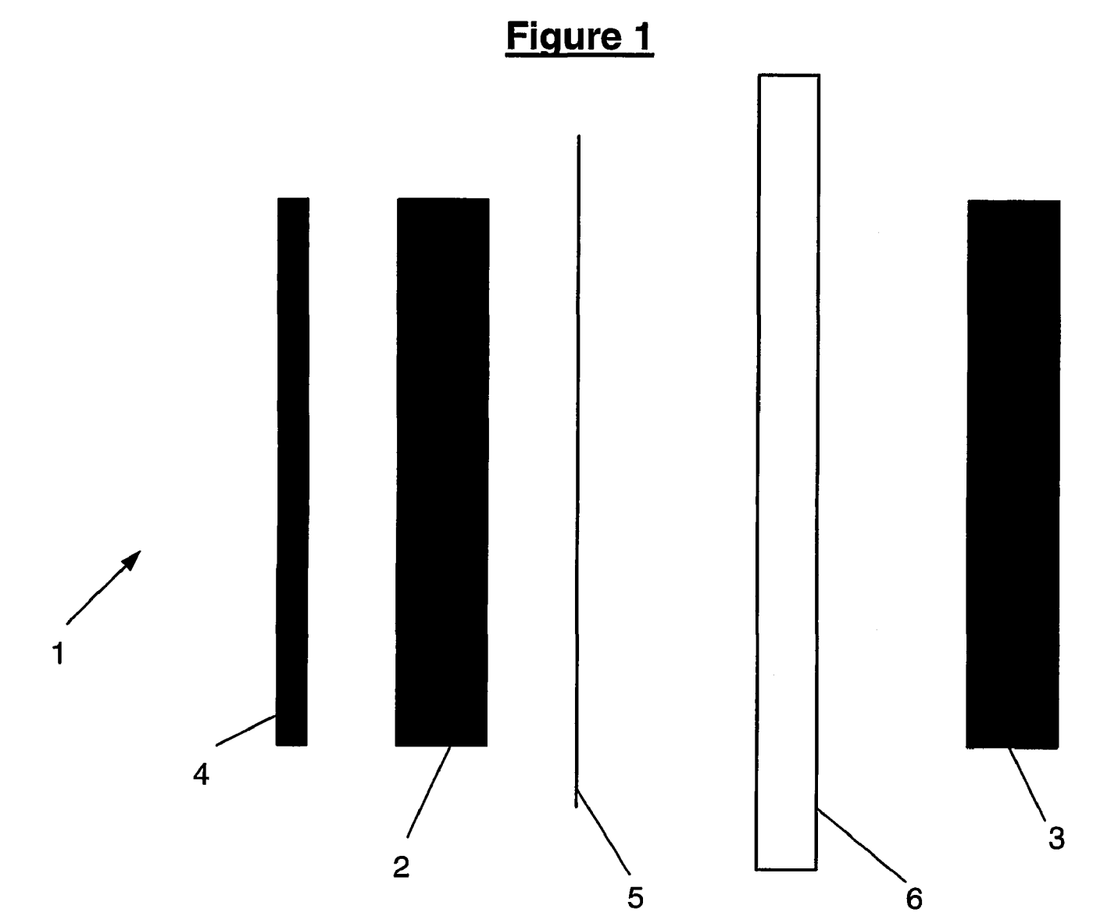
FIG. 1 shows a diagrammatic representation of a multi-focal plane display in accordance with one embodiment of the present invention.

A preferred embodiment of the present invention is shown in FIG. 1 incorporated in a dual screen display (1) of known type. The display (1) includes two overlapping, parallel liquid crystal display screens (2, 3) upon which information and/or images may be displayed by a variety of known means. In the preferred embodiment shown in simplified form in FIG. 1, a back light (4) is placed behind the rear LCD screen (2) to provide illumination for the images shown on one or both LCD screens (2, 3).

To minimise costs, both LCD screens (2, 3) are constructed in accordance with conventional manufacturing techniques, i.e. crossed polarising filters are located on the front and rear surface of each liquid crystal active element. A consequence of the characteristic operating mechanism of liquid crystal displays is that the plane polarisation of the light emerging from the front surface of the rear LCD screen (2) is crossed with respect to the polarisation plane of the rear surface of the front LCD screen (3).

To rotate the emergent light from the rear screen (2) by the required angle to align with the rear polarisation filter of the front LCD screen (3), an optical retarder (5) is placed between the LCD screens (2, 3). Whilst in theory, the retarder (5) may be placed anywhere between the screens (2, 3), the use of prior art retarders such as polyester necessitates a location adjacent the front of the rear LCD screen (2). This is primarily due to the need for a diffusive pattern to be applied to retarders to avoid interference effects degrading the resultant display (1) image. Interference patterns are generated by both the Moiré effect,—i.e., interference caused by slight period disparities between the structured surface on the LCD screens (2, 3), and the effects of chromatic separation of white polarised light into 'rainbow' coloured fringes. Diffusing the light is therefore used to deregulate the interference patterns generated.

It has been found in practice that chemical etching of the diffusion pattern on polyester does not provide sufficient control of the colour interference patterns. The main alternative to chemical etching involves embossing a holographically recorded master with a randomised surface structure onto the polycarbonate retarder surface. This process is however significantly more expensive than chemical etching.

Prior art alternatives also include custom manufactured LCD screens constructed with the rear polarising filter of the front LCD screen (3) already aligned with the rear polariser of the front LCD screen (3). This re-alignment may also be undertaken after manufacture by a third party, albeit with a significant risk of damage to the LCD screens. Both means of re-alignment are prohibitively expensive.

The present invention addresses this need by use of a biaxial polypropylene film as a first order retarder (5) located between the LCD screens (2, 3). Biaxial polypropylene available direct from commercial stationery outlets has been found to produce surprisingly good results in terms of optical performance in addition to the obvious cost and availability benefits. A brightness gain of 1.96 has been measured in comparison to existing polyester retarders. Furthermore, biaxial polypropylene of sufficient thickness to form a first order retarder eliminates the colour interference effects whilst also permitting the use of chemically etched diffusion pattern to eliminate the Moiré interference effect without loss of image quality.

As described earlier, the degree of retardance/retardation is generally expressed in terms of
d) linear displacement—the difference in the optical path length between the wave fronts of the two components, expressed in nanometers (nm);
e) fractional wavelength—the optical path length difference expressed as a fraction of a given wavelength, obtained by dividing linear displacement values by a particular phase angle value or wavelength by $2\pi$; and
f) phase angle—the phase difference between the wave fronts of the two component beams;

It and thus, it can be thus seen that:

$$\delta = \Gamma/\lambda.2\pi$$

where $\delta$=the phase angle
$\Gamma$=the linear displacement
$\lambda$=the wavelength
$\Gamma/\lambda$=is the fractional wavelength.

As biaxial polypropylene may readily be produced as thin flexible durable sheets, sufficiently thin to produce a linear displacement less than one wavelength of visible light, i.e, the retarder produces a phase angle of less than $\pi$, it is said to be of the first order. Prior art retarders used in this application produced resultant phase angles between $\pi$ and $2\pi$, or between $2\pi$ and $3\pi$, i.e. second order, or third order retarders respectively.

The chemically etched diffusion pattern may be applied to a diffuser in the form of sheet of acrylic (6) or similar placed between the LCD screens (2, 3). The biaxial polypropylene also provides sufficient chromatic uniformity that the retarder (5) can be placed at any point between the LCD screens (2, 3).

According to further embodiments (not shown) the diffuser (6) may be either formed as a separate layer distinct from said retarder (5) or diffusive properties may be applied to the surface of the retarder (5) itself.

The said diffusive effects of the diffuser (6) may be formed by chemical etching; embossing; impressing: or calendering a random, non-periodic surface structure onto the diffuser surface.

The ideal separation of the said diffuser (6) from the surface of the display (3) surface is a trade off between image clarity (decrease with separation) and diffusion of the moiré effects (increasing with separation). This separation can be controlled by using adhesive (not shown) of a predetermined thickness, to attach the diffuser (6) to the display (3) surface. This is applicable for both embodiments using of a separate distinct diffuser (6) or one integrally formed with, or attached to the said retarder (5).

It is envisaged that the biaxial polypropylene film thickness and variations in the manufacturing processes and/or constituents may affect some optical properties including the difference in refractive index for each polarisation axis, different frequencies and temperature. However, according to tests to date, biaxial polypropylene exhibits achromatic retarding properties.

It will be appreciated that although the preferred embodiment has been described with reference to a dual-screen liquid crystal display, the invention is not limited to same. It will also be apparent to those skilled in the art that the invention may be equally applicable to other optical systems benefiting from the said properties of a biaxial polypropylene retarder.

Furthermore, it will be understood that other materials may be used as retarders in such multi-focal plane displays provided they provide the first order retardive properties of biaxial polypropylene.

Aspects of the present invention have been described by way of example only and it should be appreciated that modifications and additions may be made thereto without departing from the scope thereof.

The invention claimed is:

1. A multi-component display comprising:
a first display screen comprising a first plurality of pixels, wherein said first display screen is operable to display graphical objects using said first plurality of pixels, and wherein each of said first plurality of pixels comprises a respective red color filter, a respective green color filter and a respective blue color filter;
a second display screen comprising a second plurality of pixels, wherein said second display screen is operable to display graphical objects using said second plurality of pixels, wherein said second display screen overlaps said first display screen;
a first-order optical retarder disposed between said first and second display screens;
an optical component disposed between said first and second display screens; and
a light source for illuminating said first and second display screens.

2. A method of manufacturing a multi-component display, said method comprising:
positioning a first display screen and a second display screen in an overlapping arrangement, wherein said first display screen is operable to display graphical objects using a first plurality of pixels of said first display screen, and wherein each of said first plurality of pixels comprises a respective red color filter, a respective green color filter and a respective blue color filter;
disposing an optical component between said first and second display screens;
disposing a first-order optical retarder between said first and second display screens; and
disposing a light source behind a display screen selected from said first and second display screens.

3. The multi-component display of claim 1, wherein said optical component is operable to perform at least one light processing operation other than retardation of light.

4. The multi-component display of claim 3, wherein said first-order optical retarder and said optical component are integrated into a common component.

5. The multi-component display of claim 1, wherein said optical component is physically separate from said first-order optical retarder.

6. The multi-component display of claim 5, wherein said optical component is adhered, by adhesive, to a display screen selected from said first display screen and said second display screen.

7. The multi-component display of claim 1, wherein said adhesive comprises a predetermined thickness.

8. The multi-component display of claim 1, wherein said first-order optical retarder comprises a clear flexible film.

9. The multi-component display of claim 1, wherein said optical component comprises a diffuser, said diffuser comprising a surface with at least one diffusive effect, and wherein said diffusive effect is selected from a group consisting of a chemical etching, an embossing, an impressing, and a calendered surface structure.

10. The multi-component display of claim 1, wherein a surface of said first-order optical retarder comprises at least one diffusive effect, said diffusive effect is selected from a group consisting of a chemical etching, an embossing, an impressing, and a calendered surface structure.

11. The multi-component display of claim 1, wherein said first and second display screens each comprise a liquid crystal display.

12. The multi-component display of claim 1, wherein said first-order optical retarder is operable to cause a linear displacement selected from a group consisting of a linear displacement equal to one wavelength of light incident on said multi-component display and a linear displacement of less than one wavelength of light incident on said multi-component display.

13. The multi-component display of claim 12, wherein said wavelength of light is approximately 560 nanometers.

14. The multi-component display of claim 1, wherein said light source comprises a backlight for illuminating said graphical objects displayed on said first and second display screens.

15. The multi-component display of claim 1, wherein said first-order optical retarder comprises biaxial polypropylene.

16. The multi-component display of claim 1, wherein said first-order optical retarder is operable to cause a phase angle retardation selected from a group consisting of a phase angle retardation equal to one wavelength of light incident on said multi-component display and a phase angle retardation of less than one wavelength of light incident on said multi-component display.

17. The multi-component display of claim 1, wherein said first display screen further comprises a first polarizer, and wherein said first-order optical retarder is further disposed between said first polarizer and said second display screen.

18. The multi-component display of claim 17, wherein said second display screen further comprises a second polarizer, and wherein said first-order optical retarder is further disposed between said first polarizer and said second polarizer.

19. The method of claim 2, wherein said first-order optical retarder comprises biaxial polypropylene.

20. The method of claim 2, wherein said optical component is operable to perform at least one light processing operation other than retardation of light.

21. The method of claim 20 further comprising:
forming said optical component on at least one surface of said first-order optical retarder to generate an integrated component; and
wherein said disposing said optical component and said disposing said first-order optical retarder further comprises disposing said integrated component between said first and second display screens.

22. The method of claim 2, wherein said disposing said optical component further comprises physically separating said optical component from said first-order optical retarder between said first and second display screens.

23. The method of claim 2 further comprising:
adhering said optical component to a display screen selected from a group consisting of said first and second display screens, wherein said adhering further comprises adhering said optical component using an adhesive.

24. The method of claim 23 further comprising:
applying said adhesive to a component with a predetermined thickness, wherein said component is selected from a group consisting of said first display screen, said second display screen, and said optical component.

25. The method of claim 2, wherein said first-order optical retarder comprises a clear flexible film.

26. The method of claim 2, wherein said optical component comprises a diffuser, and wherein said optical component comprises a surface with at least one diffusive effect operable to diffuse light passing through said optical component.

27. The method of claim 26 further comprising:
creating said at least one diffusive effect on said surface of said optical component using an operation selected from a group consisting of a chemical etching, embossing, impressing, and calendering.

28. The method of claim 2 further comprising:
creating at least one diffusive effect on a surface of said first-order optical retarder using an operation selected from a group consisting of a chemical etching, embossing, impressing, and calendaring; and
wherein said at least one diffusive effect is operable to diffuse light passing through said first-order optical retarder.

29. The method of claim 2, wherein said first and second display screens each comprise a liquid crystal display.

30. The method of claim 2, wherein said first-order optical retarder is operable to cause a linear displacement selected from a group consisting of a linear displacement equal to one wavelength of light incident on said multi-component display and a linear displacement of less than one wavelength of light incident on said multi-component display.

31. The method of claim 30, wherein said wavelength of light is approximately 560 nanometers.

32. The method of claim 2, wherein said first-order optical retarder is operable to cause a phase angle retardation selected from a group consisting of a phase angle retardation equal to one wavelength of light incident on said multi-component display and a phase angle retardation of less than one wavelength of light incident on said multi-component display.

33. The method of claim 2, wherein said first display screen further comprises a first polarizer, and wherein said disposing further comprises disposing said first-order optical retarder between said first polarizer and said second display screen.

34. The method of claim 33, wherein said second display screen comprises a second polarizer, and wherein said disposing further comprises disposing said first-order optical retarder between said first polarizer and said second polarizer.

* * * * *